US012613562B2

(12) United States Patent
Kuo

(10) Patent No.: US 12,613,562 B2
(45) Date of Patent: Apr. 28, 2026

(54) PORTABLE ELECTRONIC DEVICE

(71) Applicant: Getac Technology Corporation, New Taipei (TW)

(72) Inventor: Hsiu-Yu Kuo, Taipei (TW)

(73) Assignee: Getac Technology Corporation, New Taipei (TW)

( * ) Notice: Subject to any disclaimer, the term of this patent is extended or adjusted under 35 U.S.C. 154(b) by 126 days.

(21) Appl. No.: 18/604,749

(22) Filed: Mar. 14, 2024

(65) Prior Publication Data

US 2025/0053206 A1 Feb. 13, 2025

Related U.S. Application Data

(60) Provisional application No. 63/531,583, filed on Aug. 9, 2023.

(51) Int. Cl.
| | |
|---|---|
| *G06F 1/16* | (2006.01) |
| *G06F 1/20* | (2006.01) |
| *H04B 10/116* | (2013.01) |

(52) U.S. Cl.
CPC .......... *G06F 1/1698* (2013.01); *G06F 1/1656* (2013.01); *G06F 1/203* (2013.01); *H04B 10/116* (2013.01)

(58) Field of Classification Search
CPC ...... G06F 1/1698; G06F 1/1656; G06F 1/203; G06F 1/1607; G06F 1/1626; H04B 10/116; H04B 10/1143
See application file for complete search history.

(56) References Cited

U.S. PATENT DOCUMENTS

| | | | | |
|---|---|---|---|---|
| 5,781,405 A | * | 7/1998 | Vossler | G06F 3/0202 |
| | | | | 29/25.03 |
| 6,327,141 B2 | * | 12/2001 | Kim | G06F 1/1616 |
| | | | | 235/487 |
| 9,699,282 B2 | * | 7/2017 | Zhong | H04M 1/0272 |
| 10,076,254 B2 | * | 9/2018 | Woo | A61B 5/681 |
| 10,666,357 B2 | | 5/2020 | Teo et al. | |
| 11,005,982 B2 | * | 5/2021 | Kinouchi | G03B 15/00 |
| 2004/0174137 A1 | * | 9/2004 | Kim | H04M 1/0208 |
| | | | | 348/E7.079 |

(Continued)

FOREIGN PATENT DOCUMENTS

| | | |
|---|---|---|
| CN | 207457918 U | 6/2018 |
| CN | 208848115 U | 5/2019 |

(Continued)

OTHER PUBLICATIONS

AN521, IRLED Selection Guide For Si114X Proximity Applications, Silicon Laboratories, Rev. 0.1 1/15, 2015.
European Search Report, Jul. 10, 2024, Germany.

*Primary Examiner* — Benyam Ketema
(74) *Attorney, Agent, or Firm* — Troutman Pepper Locke LLP; Tim Tingkang Xia, Esq.

(57) ABSTRACT

A portable electronic device includes a display body, a rotatable component, and an optical communication module. The display body has a display screen. The rotatable component is pivotally connected to the display body. The rotatable component has an opening. The optical communication module is disposed inside the rotatable component. The optical communication module includes a light emitter and a light receiver, and the light emitter and the light receiver faces the opening.

20 Claims, 7 Drawing Sheets

(56)          References Cited

U.S. PATENT DOCUMENTS

| | | | | |
|---|---|---|---|---|
| 2006/0105806 A1* | 5/2006 | Vance | ................. | H04M 1/0208 |
| | | | | 348/E5.026 |
| 2007/0146345 A1* | 6/2007 | Cheng | .................. | G06F 1/1635 |
| | | | | 345/173 |
| 2009/0032420 A1 | 2/2009 | Zenzai | | |
| 2009/0111515 A1* | 4/2009 | Joo | ........................ | H04N 7/142 |
| | | | | 455/566 |
| 2010/0099458 A1* | 4/2010 | Shin | ................... | H04M 1/0272 |
| | | | | 348/744 |
| 2013/0069617 A1* | 3/2013 | Lee | ...................... | H01R 31/065 |
| | | | | 323/318 |
| 2014/0295915 A1* | 10/2014 | Zhong | ................ | H04M 1/0272 |
| | | | | 455/556.1 |
| 2016/0241686 A1* | 8/2016 | Zhang | ................... | H04M 1/026 |
| 2021/0396935 A1 | 12/2021 | Chen et al. | | |
| 2023/0123808 A1 | 4/2023 | Lin et al. | | |

FOREIGN PATENT DOCUMENTS

| | | |
|---|---|---|
| JP | 2002215265 A | 7/2002 |
| TW | 201632138 A | 9/2016 |
| TW | I678924 B | 12/2019 |
| TW | 202145724 A | 12/2021 |

* cited by examiner

PORTABLE ELECTRONIC DEVICE

CROSS-REFERENCE TO RELATED PATENT APPLICATION

This application claims the benefit of priority to the U.S. Provisional Patent Application Ser. No. 63/531,583, filed on Aug. 9, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a portable electronic device, and more particularly to a portable electronic device having an optical communication module.

BACKGROUND OF THE DISCLOSURE

Light Fidelity (Li-Fi) refers to the transmission of information using optical communication technology. For example, a visible light source (e.g., a light bulb) is used as a signal transmitter, and the light can be controlled by a controller to turn on and off, such as to control the communication between the signal transmitter and a terminal receiver.

Currently, there are already examples of an optical communication module being applied to a portable electronic device, such as a notebook computer or a tablet computer. However, in the related art, the optical communication module is installed onto the portable electronic device such that light signals can only be transmitted and received at a fixed angle, which limits the communication range of the optical communication module. The optical communication module cannot receive light signals at a large angle, the quality of the communication is compromised.

In addition, in the related art, the optical communication module is additionally installed on a periphery of the portable electronic device. In other words, the optical communication module will occupy the space around the portable electronic device, which can affect the arrangement of other components (e.g., USB interfaces).

SUMMARY OF THE DISCLOSURE

The present disclosure provides a portable electronic device having an optical communication module, which can address issues of the optical communication module occupying additional space and only being capable of transmitting and receiving signals at fixed angles.

One of the technical aspects adopted by the present disclosure is to provide a portable electronic device, which includes a display body, a rotatable component, and an optical communication module. The display body includes a display screen. The rotatable component is pivotally connected to the display body. The rotatable component has an opening. The optical communication module is disposed inside the rotatable component. The optical communication module includes a light emitter and a light receiver, and the light emitter and the light receiver face the opening.

Therefore, in the portable electronic device provided by the present disclosure, by virtue of the optical communication module being integrated into the rotatable component, the optical communication module can transmit and receive signals at different angles through the rotating structure of the rotatable component, such that the optical communication module can transmit and receive light signals at a large angle, and has good communication quality.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
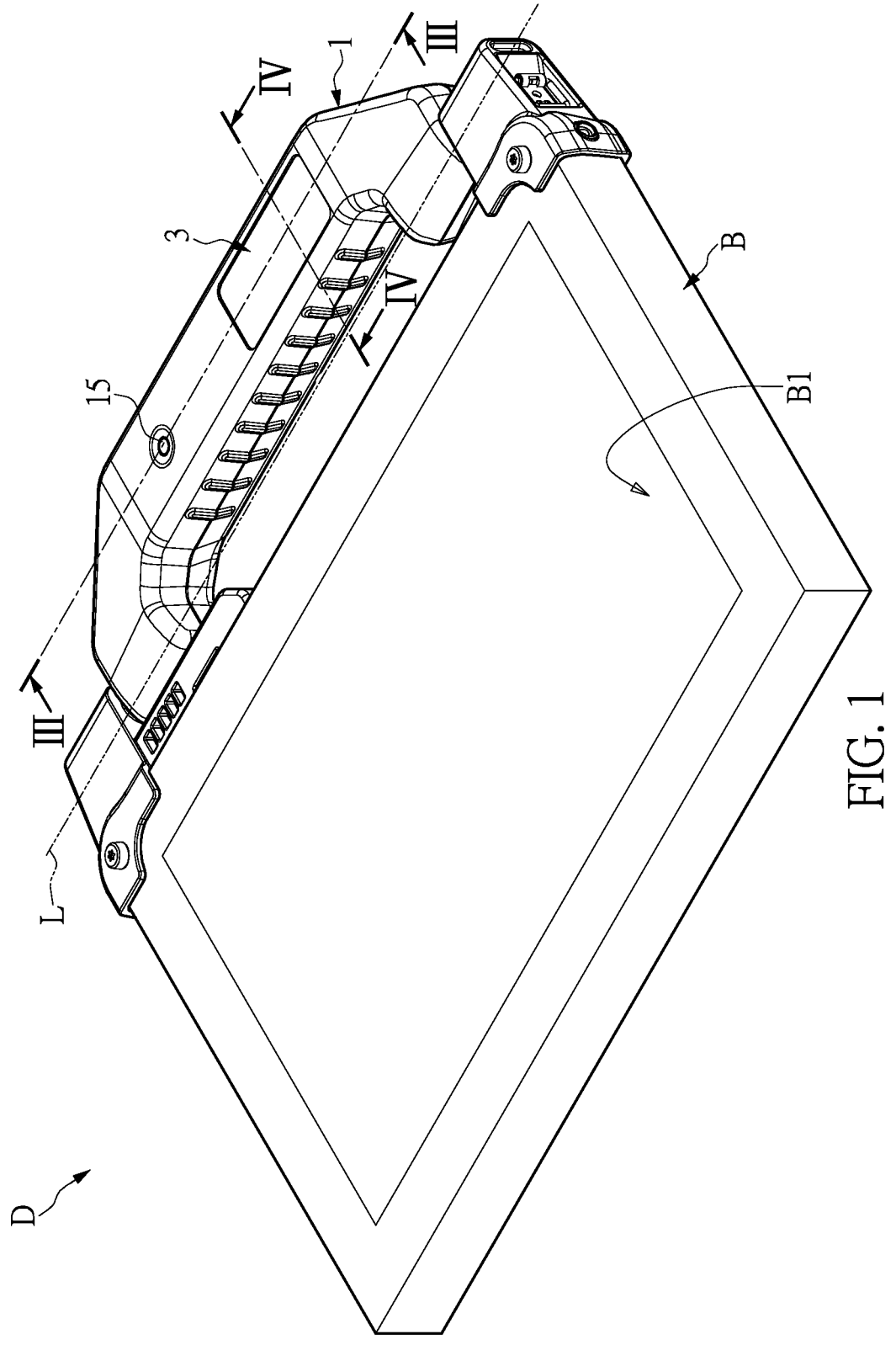
FIG. 1 is a first schematic view of a portable electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiment

Figure 2:
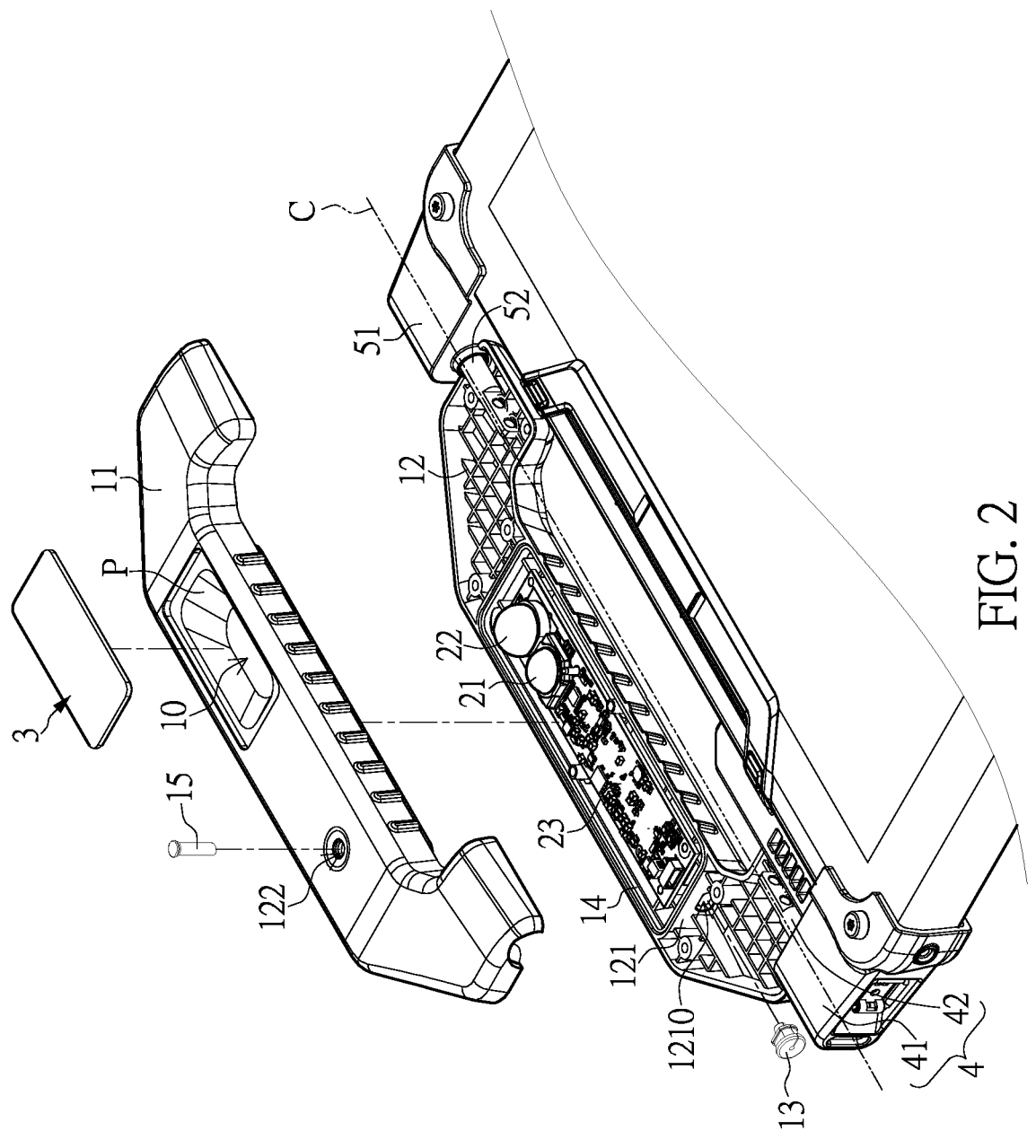
FIG. 2 is a schematic exploded view of the portable electronic device according to the present disclosure.

Referring to FIG. 1 and FIG. 2, FIG. 1 is a first schematic view of a portable electronic device according to the present disclosure, and FIG. 2 is a schematic exploded view of the portable electronic device according to the present disclosure. The present disclosure provides a portable electronic device D, which includes a display body B, a rotatable component 1, and an optical communication module 2. The display body B includes a display screen B1. The rotatable component 1 is pivotally connected to the display body B. For example, the display body B is a tablet computer, and the rotatable component 1 is a rotatable handle that is installed to a side of the tablet computer. However, the display body B is not limited to being a particular type of electronic device in the present disclosure. In other embodiments, the display body B can also be a notebook computer. The rotatable component 1 can rotate relative to the display body B. The optical communication module 2 is disposed inside the rotatable component 1 and communicates by the LI-FI technology.

As shown in FIG. 2, the optical communication module 2 includes a light emitter 21 and a light receiver 22, and a circuit board 23. The light emitter 21 and the light receiver 22 are disposed on and electrically connected to the circuit board 23. The rotatable component 1 has an opening 10, and the light emitter 21 and the light receiver 22 face the opening 10. Furthermore, the rotatable component 1 includes a first housing 11 and a second housing 12. That is, the first housing 11 and a second housing 12 are assembled with each other to form the rotatable component 1. The opening 10 is formed at the first housing 11. For example, the light emitter 21 is an infrared light emitting diode (IR LED) that is capable of emitting infrared, and the light receiver 22 is a photodiode or a phototransistor that is used to receive an external light, such as the infrared. However, the present disclosure is not limited thereto. In other embodiments, the optical communication module 2 can emit and receive other lights such as visible light or UV light.

As shown in FIG. 1 and FIG. 2, the rotatable component 1 can rotate relative to an axis L. The rotatable component 1 further includes a light-permeable member 3. The light-permeable member 3 has a flat shape and is disposed in the opening 10. The shape of the light-permeable member 3 is not limited in the present disclosure. The light-permeable member 3 is, for example, an IR pass filter which can allow infrared with wavelengths above 850 nm to pass therethrough, but the present disclosure is not limited thereto. The type of the light-permeable member 3 is selected according to the type of light that is emitted and received by the optical communication module 2. When the optical communication module 2 emits and receives visible light, the light-permeable member 3 only allows visible light with a specific wavelength to pass. When the optical communication module 2 emits and receives UV light, the light-permeable member 3 only allows UV light with a specific wavelength to pass. Therefore, the optical communication module 2 can emit and receive light with specific wavelengths through the configuration of the light-permeable member 3.

The light-permeable member 3 covers the light emitter 21 and the light receiver 22. Moreover, projections of the light emitter 21 and the light receiver 22 that are projected onto the light-permeable member 3 completely overlap the light-permeable member 3, and projections of the light emitter 21 and the light receiver 22 that are projected onto the light-permeable member 3 is smaller than an area of the light-permeable member 3. Therefore, the infrared that is generated by the light emitter 21 can pass through the light-permeable member 3 and then be emitted to external environment, specific external light such as the infrared with the wavelength above 850 nm can pass through the light-permeable member 3 and be received by the light receiver 22, and the infrared with the wavelength less than 850 nm is blocked by the light-permeable member 3.

Figure 3:
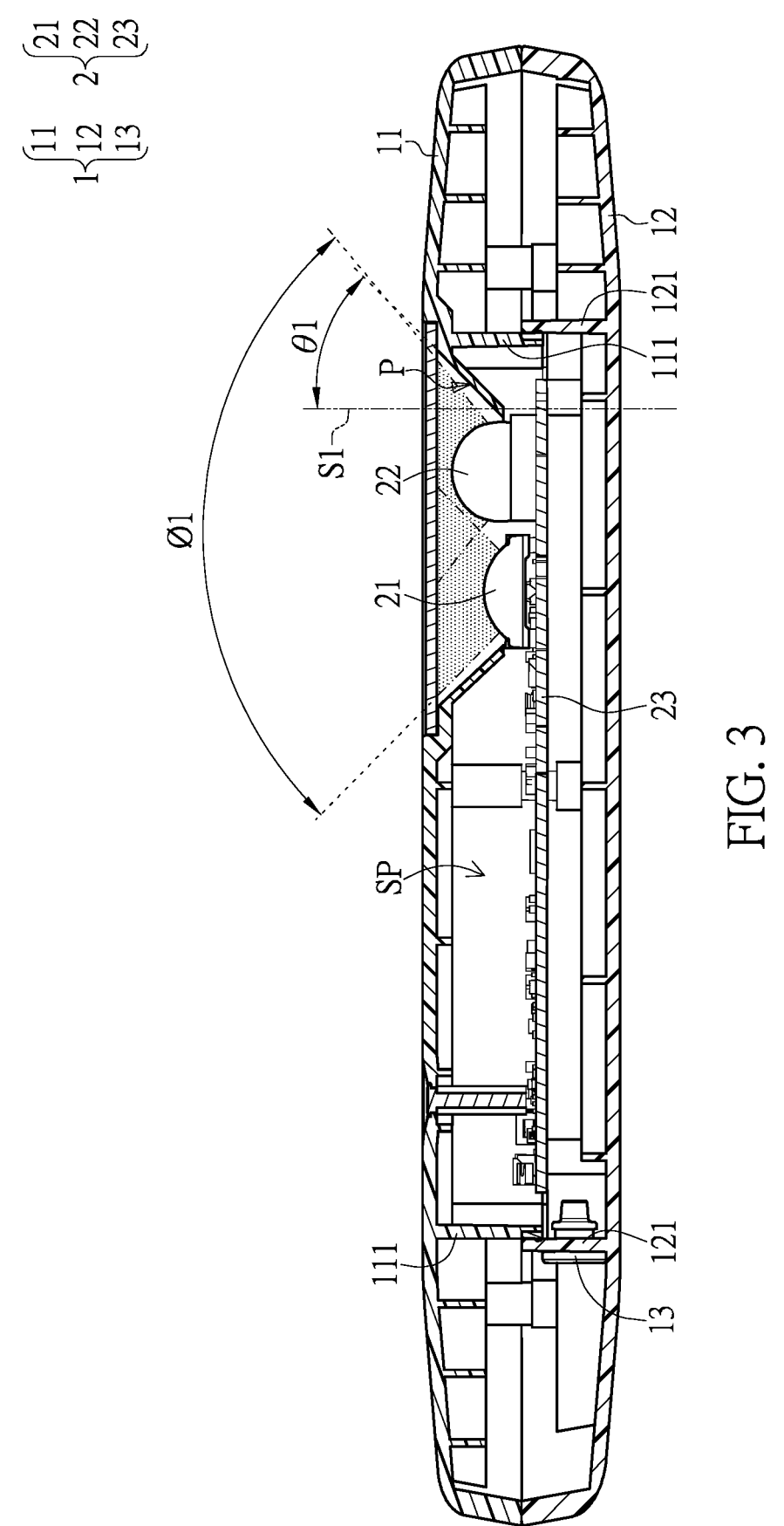
FIG. 3 is a schematic cross-sectional view taken along line III-III of FIG. 1.
Figure 4:
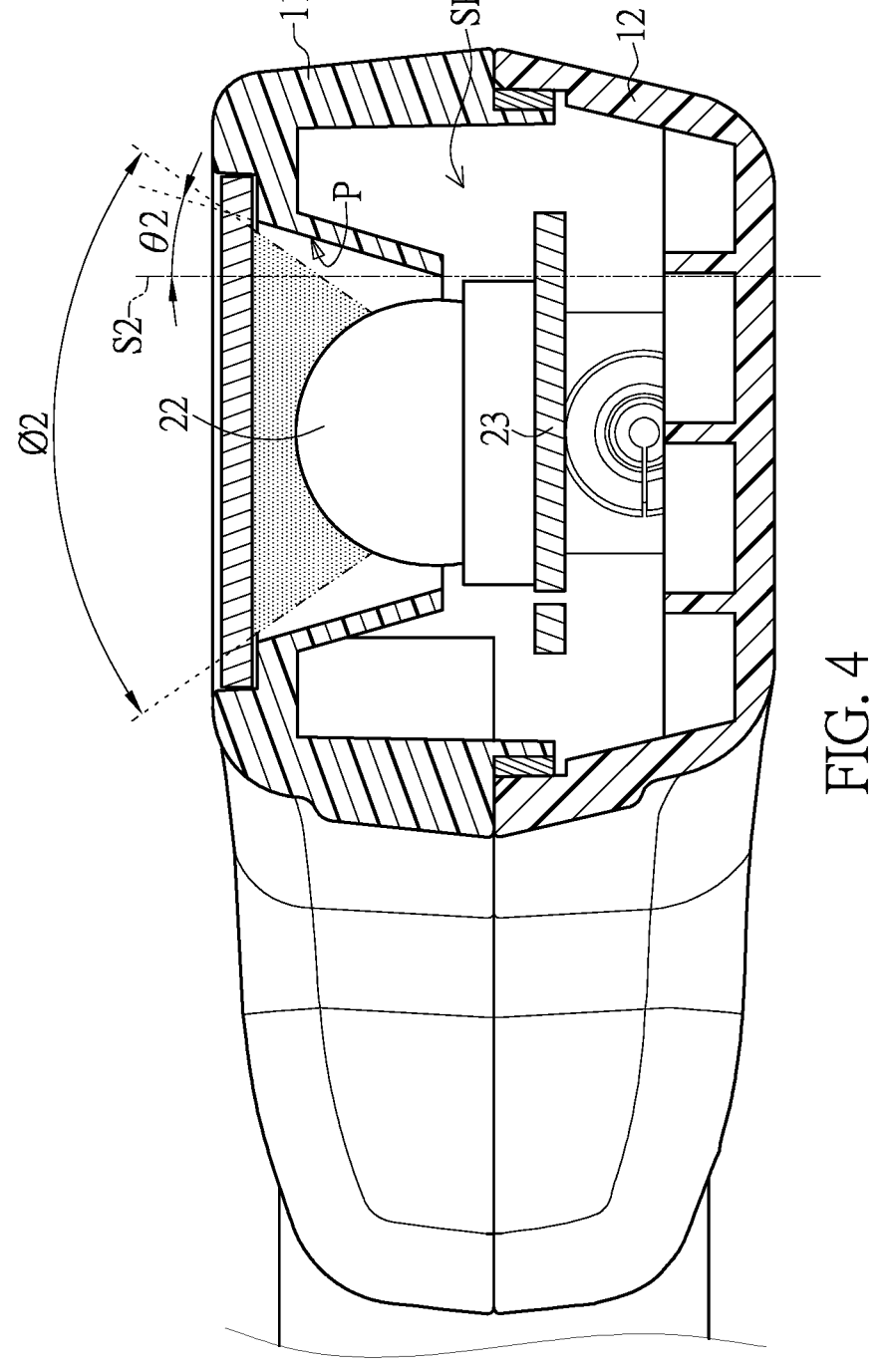
FIG. 4 is a schematic cross-sectional view taken along line IV-IV of FIG. 1.
Figure 5:
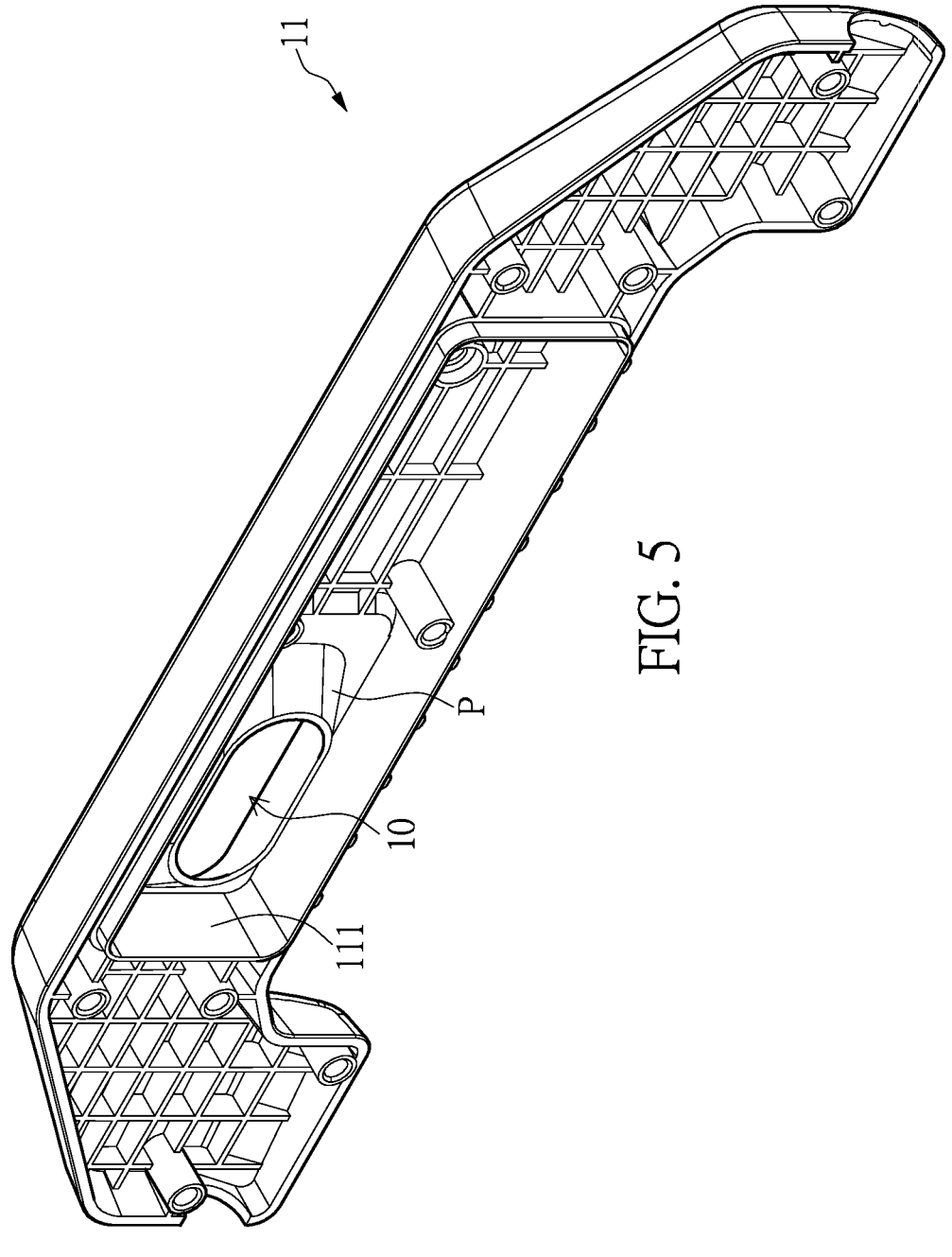
FIG. 5 is a schematic view of a first housing of the portable electronic device according to the present disclosure.

Referring to FIG. 3 to FIG. 5, FIG. 3 is a schematic cross-sectional view taken along line III-III of FIG. 1, FIG. 4 is a schematic cross-sectional view taken along line IV-IV of FIG. 1, and FIG. 5 is a schematic view of a first housing of the portable electronic device according to the present disclosure. The first housing 11 has a first inner annular wall 111 therein, and the second housing 12 has a second inner annular wall 121 therein. The first inner annular wall 111 and the second inner annular wall 121 jointly define an accommodating space SP. The opening 10 is in spatial communication with the accommodating space SP, and the optical communication module 2 is disposed in the accommodating space SP.

As shown in FIG. 3 to FIG. 5, the opening 10 tapers toward an interior of the rotatable component 1 (i.e., the accommodating space SP), such that an inner surface of the opening 10 forms an inclined wall P. When the communication module 2 is disposed at the accommodating space SP, the light emitter 21 and the light receiver 22 of the communication module 2 are surround by the inclined wall P. Therefore, the inclined wall P can form a light mask, which concentrates the light incident from the external environment and is received by the optical communication module 2.

As shown in FIG. 1, the rotatable component 1 has a transverse section parallel to the cross-sectional view taken along line III-III and a longitudinal section parallel to the cross-sectional view taken along line IV-IV that are perpendicular to each other according to an extension direction of the axis L. The transverse section is parallel to the axis L, and the longitudinal section is perpendicular to the axis L.

As shown in FIG. 3, since the transverse section and the longitudinal section are perpendicular to each other, the longitudinal section is implemented in a form of a vertical line S1, and the longitudinal section (i.e., the vertical line S1) and the inclined wall P form a first included angle θ1 therebetween.

Similarly, as shown in FIG. 4, since the transverse section and the longitudinal section are perpendicular to each other, the transverse section is implemented in a form of a vertical line S2, and the transverse section (i.e., the vertical line S2) and the inclined wall P form a second included angle θ2 therebetween. Moreover, the first included angle θ1 is greater than the second included angle θ2.

Because the optical communication module 2 of the present disclosure is disposed inside the handle (i.e., the rotatable component 1), the size of the opening 10 is limited by the structure of the handle. Through the design of an inclination angle of the inclined wall P, the entry and exit of the light will not be interfered by the inclined wall P, such that the optical communication module 2 has an optimal light transmitting and receiving range. For example, in FIG. 3, a light transmission and reception angle Ø1 of the optical communication module 2 is greater than 45 degrees; in FIG.

4, a light transmission and reception angle Ø2 of the optical communication module 2 is greater than 35 degrees. As shown in FIG. 2, the first housing 11 further includes a via hole 112. The rotatable component 1 further includes an identification member 15. The identification member 15 is disposed in the via hole 112. Specifically, one end of the identification member 15 is electrically connected to the circuit board 23, and another end of the identification member 15 passes through and is exposed from the first housing 11. A type of the identification member 15 is not limited in the present disclosure. The identification member 15 is, for example, a light pipe which can be connected to a light-emitting diode (LED) on the circuit board 23. The operation of the LED is linked with the optical communication module 2. For example, during the operation, the light is emitted by the LED through the light pipe (i.e., the identification member 15), so as to remind a user that the optical communication module 2 is transmitting and receiving signals.

As shown in FIG. 2, the portable electronic device D further includes a first pivot member 4 and a second pivot member 5 that are respectively disposed on two sides of the rotatable component 1. The first pivot member 4 is closer to a through hole 1210 of the second inner annular wall 121 than the second pivot member 5. The first pivot member 4 and the second pivot member 5 are configured to be connected to the display body B and the rotatable component 1. The first pivot member 4 includes a first casing 41 and a first rotating shaft 42. The first rotating shaft 42 is rotatably connected between the rotatable component 1 and the first casing 41. The first casing 41 is disposed on the display body B. The second pivot member 5 includes a second casing 51 and a second rotating shaft 52. The second casing 51 is disposed on the display body B. The second rotating shaft 52 is rotatably connected between the rotatable component 1 and the second casing 51. Therefore, the rotatable component 1 rotates relative to the first casing 41 and the second casing 51 through the first rotating shaft 42 and the second rotating shaft 52. It is worth mentioning that a connecting line connecting the first rotating shaft 42 and the second rotating shaft 52 is the axis L. That is, the axis L is an axial line of the rotating shafts of the handle (i.e., the rotatable component 1).

In the present disclosure, a center line C connecting the light emitter 21 and the light receiver 22 is parallel to the axis L. Therefore, when the handle (i.e., the rotatable component 1) rotates, the light emitter 21 and the light receiver 22 rotate at a same angle. The illumination of a light source is directly proportional to the brightness of the light source and inversely proportional to the distance from the light source. If the emitting distance of the light emitter 21 and the receiving distance of the light receiver 22 are inconsistent, the intensity of the transmitting and receiving signals by the optical communication module 2 will be affected. Therefore, through the light emitter 21 and the light receiver 22 rotating at the same angle, the emitting distance of the light emitter 21 and the receiving distance of the light receiver 22 are the same, such that the powers of the optical communication module 2 when emitting and receiving light remain consistent with each other.

Figure 6:
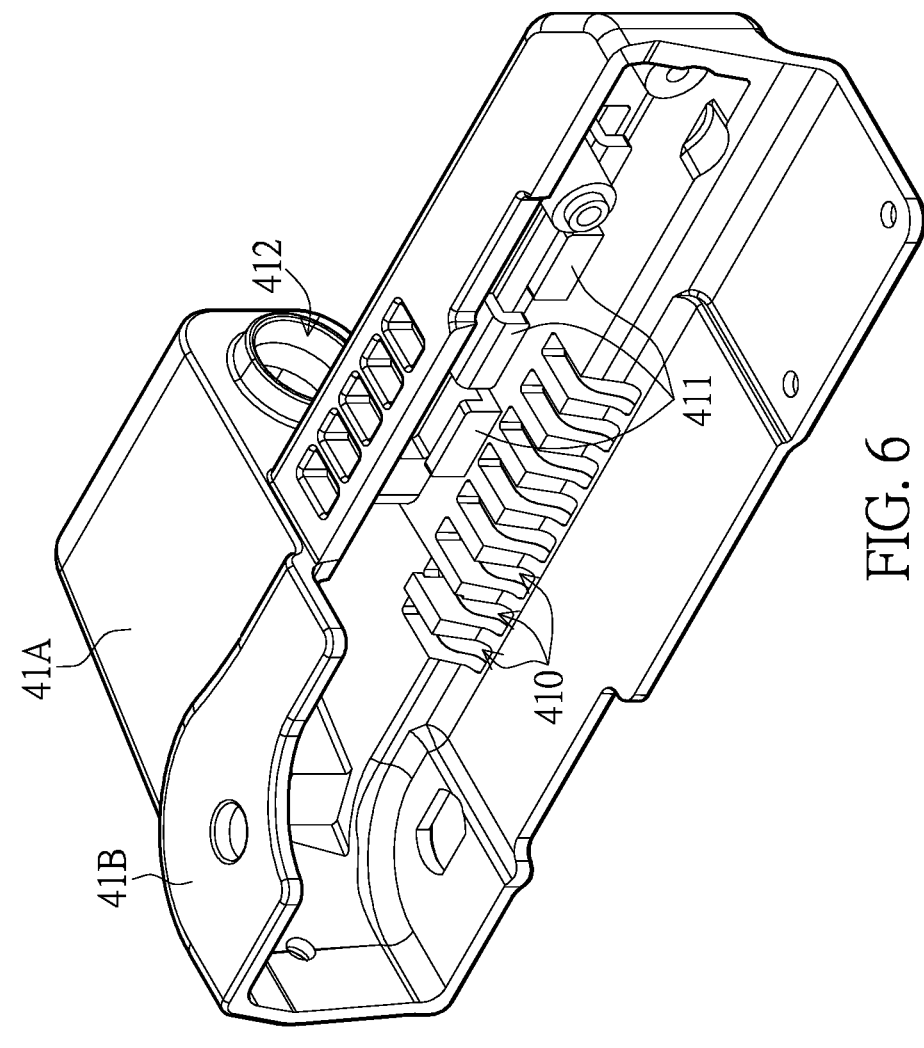
FIG. 6 is a schematic view of a first casing of the portable electronic device according to the present disclosure.
Figure 7:
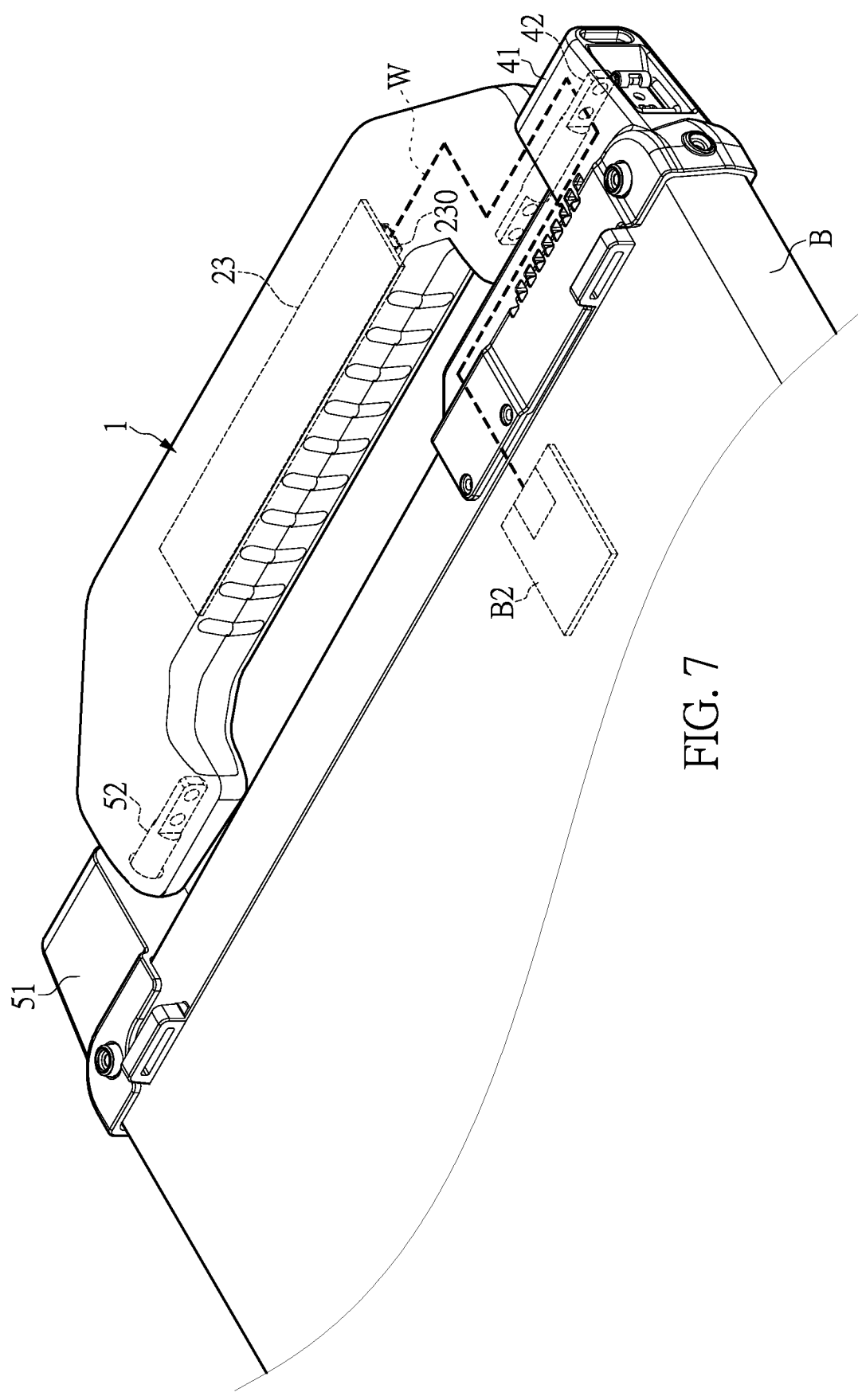
FIG. 7 is a second schematic view of the portable electronic device according to the present disclosure.

Referring to FIG. 6 and FIG. 7, FIG. 6 is a schematic view of a first casing of the portable electronic device according to the present disclosure, and FIG. 7 is a second schematic view of the portable electronic device according to the present disclosure. Comparing FIG. 1 with FIG. 7, FIG. 1 shows a front side of the portable device D, and FIG. 7 shows a back side of the portable device D. Specifically, a shape of the first casing 41 is different from a shape of the second casing 51. The first casing 41 includes a head portion 41A and a body portion 41B. The head portion 41A has an opening 412 for the first rotating shaft 42 to be inserted. The body portion 41B is a part of the first casing 41 that is used for connecting to the display body B. An internal space of the body portion 41B and an internal space of the display body B are in spatial communication with each other to allow wires for signal transmission to pass through. It should be noted that the second casing 51 also has an opening that is similar to the first casing 41 for the second rotating shaft 52 to be inserted, but the second casing 51 has no space for the wires to pass through.

Through the structural design of dividing the first housing 41 into the head portion 41A and the body portion 41B, the first rotating shaft 42 can be inserted into the opening 412 of the head portion 41A, and the body portion 41B has enough space inside to accommodate other components.

In addition, the second inner annular wall has a through hole 1210, and the rotatable component 1 further includes a first waterproof member 13 and a second waterproof member 14. The first waterproof member 13 is disposed at the through hole 1210. The second waterproof member 14 is disposed at a junction between the first inner annular wall 111 and the second inner annular wall 121. For example, the first waterproof member 13 and the second waterproof member 14 are made of elastic waterproof rubber, the first waterproof member 13 is a waterproof plug, and the second waterproof member 14 is an O-ring.

The display body B further includes a control board B2. The control board B2 is electrically connected to the circuit board 23 through at least one conductive cable W. As shown in FIG. 7, an extension direction of the at least one conductive cable W is indicated by a dotted line. One end of the at least one conductive cable W is electrically connected to the control board B2 inside the rotatable component 1. For example, the control board B2 can be a central processing unit (CPU) or a network interface card, but the present disclosure is not limited thereto. Another end of the at least one conductive cable W passes through the through hole 1210 of the second inner annular wall 121 and the opening 412 of the head portion 41A, and is electrically connected to an interface 230 of an circuit board 23 inside the display body B after passing through the body portion 41B. Through the configuration of the first waterproof member 13 and the second waterproof member 14, external moisture can be prevented from penetrating into the accommodating space SP through the through hole 1210 or the junction between the first inner annular wall 111 and the second inner annular wall 121, resulting in the optical communication module 2 getting wet and causing a short circuit.

Reference is further made to FIGS. 6 and 7. A wall of the body portion 41 has a plurality of heat dissipation holes 410. The first casing 41 includes a cable tray 411 therein. The cable tray 411 is adjacent to the plurality of heat dissipation holes 410. The plurality of heat dissipation holes 410 are in communication with the internal space of the body portion 41B and the internal space of the display body B. The heat energy generated by the internal components of the display body B can be diffused through the plurality of heat dissipation holes 410 to improve the heat dissipation effect. Furthermore, the display body B includes a fan (not shown in the figures) therein, and the fan is close to the plurality of heat dissipation holes 410. Therefore, the heat dissipation effect can be further enhanced through the configuration of the fan.

In addition, the at least one conductive cable W is used for being stored in the cable tray 411. A quantity of the conductive cable W is not limited in the present disclosure. When the quantity of the conductive cable W is plural, the conductive cables W can be organized and stored in the cable tray 411 to avoid breakage from being entangled with each other or excessively bent.

Beneficial Effects of the Embodiment

In conclusion, in the portable electronic device D provided by the present disclosure, by virtue of the optical communication module 2 being integrated into the rotatable component 1, the optical communication module 2 can be rotated to face the light source to easily transmit and receive signals through the rotatable structure of the rotatable component 1, and the range of the optical communication module 2 that transmits and receives signals can be increased.

Moreover, through the inclined wall P forming a light mask to surround the optical communication module 2 and the design of an inclination angle of the inclined wall P, the entry and exit of the light will not be interfered by the inclined wall P, such that the optical communication module 2 has an optimal light transmitting and receiving range. For example, in FIG. 3, a light transmission and reception angle Ø1 of the optical communication module 2 is greater than 45 degrees; in FIG. 4, a light transmission and reception angle Ø2 of the optical communication module 2 is greater than 35 degrees.

In the present disclosure, a center line C connecting the light emitter 21 and the light receiver 22 is parallel to the axis L. Therefore, when the handle (i.e., the rotatable component 1) rotates, the light emitter 21 and the light receiver 22 rotate at a same angle. The illumination of a light source is directly proportional to the brightness of the light source and inversely proportional to the distance from the light source. If the emitting distance of the light emitter 21 and the receiving distance of the light receiver 22 are inconsistent, the intensity of the transmitting and receiving signals by the optical communication module 2 will be affected. Therefore, through the light emitter 21 and the light receiver 22 rotating at the same angle, the emitting distance of the light emitter 21 and the receiving distance of the light receiver 22 are the same, such that the powers of the optical communication module 2 when emitting and receiving light are consistent with each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A portable electronic device, comprising:
a display body including a display screen;
a rotatable component pivotally connected to the display body, wherein the rotatable component has an opening; and an optical communication module disposed inside the rotatable component, wherein the optical communication module includes a light emitter and a light receiver, and the light emitter and the light receiver face the opening;
wherein the rotatable component rotates relative to an axis, and the light emitter and the light receiver are disposed at a distance along a direction parallel to the axis.

2. The portable electronic device according to claim 1, wherein the opening tapers toward an interior of the rotatable component.

3. The portable electronic device according to claim 2, wherein an inner surface of the opening forms an inclined wall, and the light emitter and the light receiver are surround by the inclined wall.

4. The portable electronic device according to claim 2, wherein the rotatable component has a transverse section and a longitudinal section, the transverse section is parallel to the axis, and the longitudinal section is perpendicular to the axis; wherein the longitudinal section and the inclined wall form a first included angle therebetween, the transverse section and the inclined wall form a second included angle therebetween, and the first included angle is greater than the second included angle.

5. The portable electronic device according to claim 1, wherein the rotatable component includes a first housing and a second housing that are assembled with each other, the first housing has a first inner annular wall, the second housing has a second inner annular wall, the first inner annular wall and the second inner annular wall jointly define an accommodating space, and the optical communication module is disposed in the accommodating space.

6. The portable electronic device according to claim 5, wherein the opening is formed on the first housing, and the opening is in spatial communication with the accommodating space.

7. The portable electronic device according to claim 6, wherein the optical communication module further includes a circuit board, and the light emitter and the light receiver are electrically connected to the circuit board.

8. The portable electronic device according to claim 7, wherein the rotatable component further includes a first waterproof member, the second inner annular wall has a through hole, and the first waterproof member is disposed at the through hole.

9. The portable electronic device according to claim 8, wherein the rotatable component further includes a second waterproof member, the second waterproof member is disposed at a junction between the first inner annular wall and the second inner annular wall.

10. The portable electronic device according to claim 7, wherein the rotatable component further includes an identification member, the identification member is electrically connected to the circuit board, the first housing further includes a via hole, and the identification member is disposed in the via hole and exposed from the first housing.

11. The portable electronic device according to claim 1, further comprising a light-permeable member, wherein the light-permeable member is disposed in the opening.

12. The portable electronic device according to claim 11, wherein the light-permeable member is configured to be penetrated by an infrared with a wavelength above 850 nm.

13. The portable electronic device according to claim 11, wherein orthogonal projections of the light emitter and the light receiver that are projected onto the light-permeable member completely overlap the light-permeable member, and the orthogonal projections of the light emitter and the light receiver that are projected onto the light-permeable member are smaller than an area of the light-permeable member.

14. The portable electronic device according to claim 11, wherein the light-permeable member has a flat shape.

15. The portable electronic device according to claim 1, further comprising a first pivot member and a second pivot member that are respectively disposed on two sides of the rotatable component, and the first pivot member and the second pivot member are configured to be connected to the display body and the rotatable component.

16. The portable electronic device according to claim 15, wherein the first pivot member includes a first casing and a first rotating shaft, the first casing is disposed on the display body, the first casing has a plurality of heat dissipation holes, and the first rotating shaft is connected between the rotatable component and the first casing; wherein the second pivot member includes a second casing and a second rotating shaft, the second casing is disposed on the display body, the second rotating shaft is connected between the rotatable component and the second casing; wherein the rotatable component rotates relative to the first casing and the second casing through the first rotating shaft and the second rotating shaft.

17. The portable electronic device according to claim 16, wherein the first casing includes a cable tray therein, and the cable tray is adjacent to the plurality of heat dissipation holes.

18. The portable electronic device according to claim 17, wherein the display body further includes a control board, the control board is electrically connected to the circuit board through at least one conductive cable, and the at least one conductive cable is configured to be stored in the cable tray.

19. The portable electronic device according to claim 1, wherein a center line connecting the light emitter and the light receiver is parallel to the axis.

20. The portable electronic device according to claim 19, further comprising a first pivot member and a second pivot member respectively disposed on two sides of the rotatable component, the first pivot member includes a first rotating shaft, the second pivot member includes a second rotating shaft, and the axis is a connecting line that connects the first rotating shaft and the second rotating shaft.

\* \* \* \* \*